UNITED STATES PATENT OFFICE.

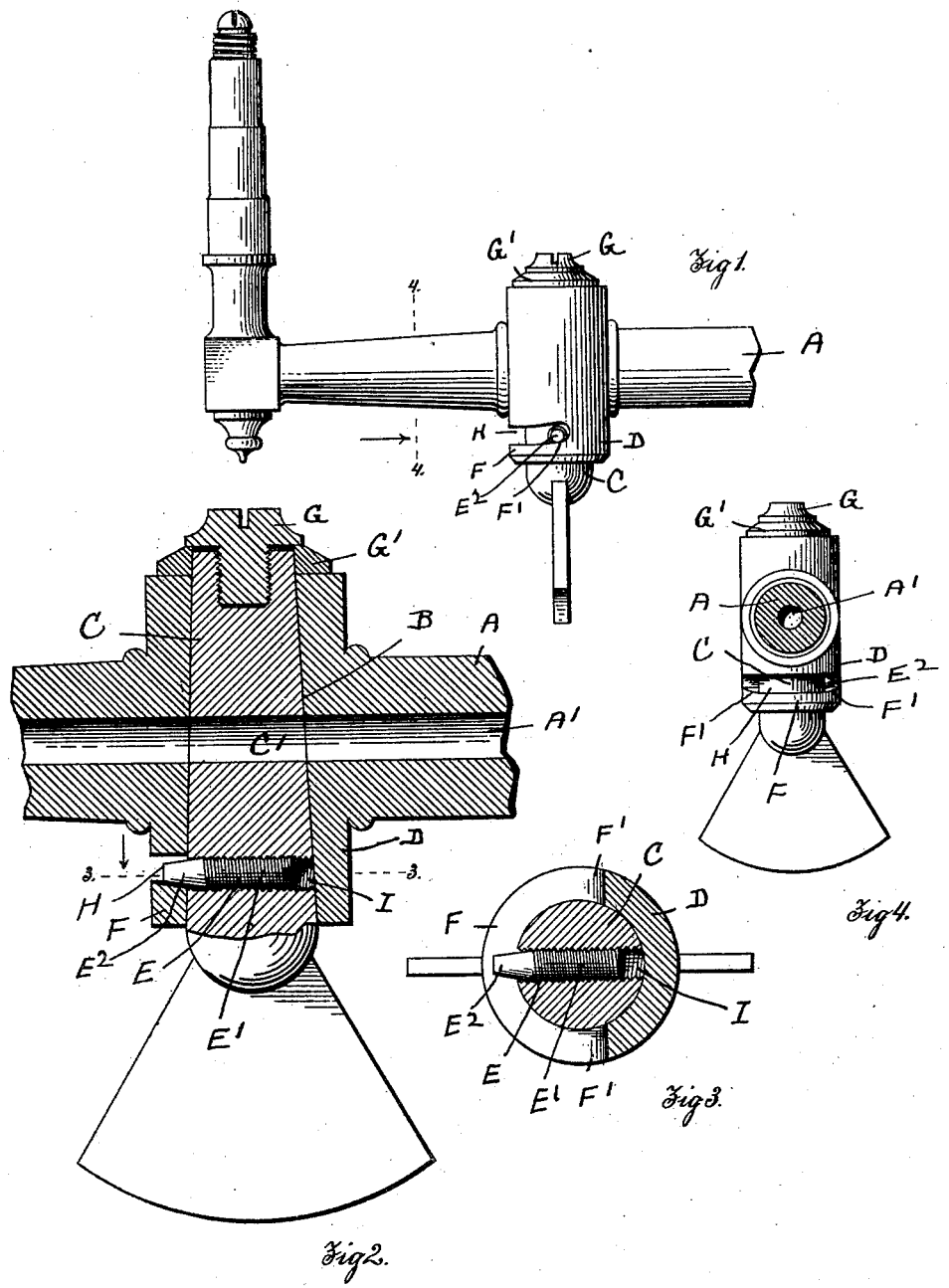

MICHAEL R. COLVIN, OF WORCESTER, MASSACHUSETTS.

GAS STOP-COCK.

SPECIFICATION forming part of Letters Patent No. 699,659, dated May 13, 1902.

Application filed August 10, 1900. Serial No. 26,502. (No model.)

*To all whom it may concern:*

Be it known that I, MICHAEL R. COLVIN, a citizen of the United States, residing at Worcester, in the county of Worcester and Commonwealth of Massachusetts, have invented a new and useful Improvement in Gas Stop-Cocks, of which the following is a specification, accompanied by drawings forming a part of the same, in which—

Figure 1 represents a side elevation of a portion of a gas-fixture containing a key embodying my improvement, showing the key closed. Fig. 2 is a central vertical longitudinal view, on a larger scale, of my improved key, showing the gasway open. Fig. 3 is a sectional view on line 3 3, Fig. 1, showing the gasway closed. Fig. 4 is a sectional view on line 4 4, Fig. 1, looking in the direction of the arrow.

Similar reference-letters refer to similar parts in the different figures.

My invention relates to gas stop-cocks having tapered rotating keys, such as are now employed for opening and closing the passages in gas pipes or fixtures; and it has for its objects to secure greater safety from the leakage of gas when the key is closed and to provide means to take up wear and maintain a close fit of the gas-key when worn from continual use. These objects I attain by the construction and arrangement of parts as hereinafter described, the several features of novelty being pointed out in the annexed claims.

Referring to the drawings, A denotes a gas-pipe forming a part of a gas-fixture or wall-bracket provided with a tapered opening or hole B, forming a seat for a tapered rotating key C, fitting the seat B, and having a passage-way C' transversely through the key C in alinement with the passage-way A' through the pipe A. Upon one side of the pipe A is a flange D, extending nearly half-way around the tapered key C, with the ends of the flange D arranged to serve as a stop for the projecting end of the pin E and limit the motion of the key to one-half a rotation.

Connecting the ends of the flange D is a bar F, having its upper surface beveled to form cam-surfaces F' F' at the ends of the bar F next the flange D, so that in case the tapered key C becomes loosened in its bearings so as to leak gas the act of closing the key will carry the projecting end of the pin E into contact with one or the other of the beveled surfaces F', which act as cam-surfaces to crowd the tapered key C against its seat in the pipe. The tapered key C may be held against the seat in the usual manner by means of a circular bolt G and a washer G'; but the key is securely held in place by the end of the pin E, which projects into a mortise or slot H above the bar F.

The pin E is screw-threaded at E' for a portion of its length and fits a screw-threaded hole I in the key C. The end $E^2$ of the pin which projects beyond the key is made tapering, and the upper edge of the bar F is slightly beveled to fit the taper of the end $E^2$ of the pin E. The entire length of the pin E is preferably equal to the diameter of the key C at the hole I to allow the pin to be inserted in the key through the mortise or seat H. The key is then turned into the position shown in Fig. 3, and the pin E is advanced by screwing it into the key until its tapered end $E^2$ projects into the mortise or slot H and bears against the beveled upper surface of the bar F. These parts are so fitted together that the tapered end $E^2$ of the pin will bear firmly against the bar F when the key C is in close contact with its seat. As the key is turned to close the gasway the end $E^2$ of the pin is brought against the ends of the flange D and over one of the beveled or cam surfaces F' F', which crowds the key closely against its seat, and as the bar F becomes worn the pin is advanced by screwing it farther into the key C in order to crowd its tapered end more firmly against the bar F.

What I claim as my invention, and desire to secure by Letters Patent, is—

1. In a gas stop-cock, comprising a tapered rotating key having a tapered seat fitting the key, the combination with the tapered rotating key of a pin having a tapered end projecting from the key, a fixed bar arranged to bear against the tapered end of said pin, and means for advancing said pin endwise in order to compensate for wear, substantially as described.

2. In a gas stop-cock, the combination of a pipe having a tapered seat, a tapered rotating key fitting said seat and having a transverse screw-threaded hole, a screw-threaded pin held in said transverse hole and having a tapered end projecting beyond the periphery of the key, said pipe having a surface arranged to bear against the tapered end of the pin, whereby said key is crowded against its seat by advancing said screw-threaded pin in the key, substantially as described.

3. The combination of a rotary plug-valve, a body in which said valve is fitted to seat and turn, an inclined cam-face formed on the exterior of the valve-body adjacent to one end of the valve-seat, in position to limit the traverse of the valve in one direction, and a locking device connected to the valve and adapted to permit free movement thereof throughout the middle portion of its traverse and to abut against the cam-face adjacent to one of the limits of said traverse.

4. The combination with a pipe, having a key-seat, of a rotating key, a projection on said key, a flange projecting from the pipe, and inclosing a portion of said key, cam-surfaces on each side of said flange and arranged to bear against the projecting end of said projection as the key is rotated.

Dated this 4th day of August, 1900.

MICHAEL R. COLVIN.

Witnesses:
RUFUS B. FOWLER,
M. C. PRICE.